United States Patent

[11] 3,622,792

[72] Inventor Jack A. Piccininni
Parsippany, N.J.
[21] Appl. No. 888,332
[22] Filed Dec. 29, 1969
[45] Patented Nov. 23, 1971
[73] Assignee Bell Telephone Laboratories, Incorporated
Berkeley Heights, Murray Hill, N.J.

[54] OPTICAL SWITCHING SYSTEM
8 Claims, 1 Drawing Fig.

[52] U.S. Cl. .......... 250/199, 340/166, 350/160, 350/266
[51] Int. Cl. .......... H04b 9/00
[50] Field of Search .......... 250/199, 220; 331/94.5; 350/150, 151, 157, 160, 285, 161, 266; 340/166

[56] References Cited

UNITED STATES PATENTS

| | | | |
|---|---|---|---|
| 2,920,529 | 1/1960 | Blythe .......... | 350/285 |
| 3,402,297 | 5/1965 | Harris .......... | 250/199 |
| 3,513,323 | 5/1970 | Sincerbox et al. .......... | 350/157 |

*Primary Examiner*—Robert L. Griffin
*Assistant Examiner*—Albert J. Mayer
*Attorneys*—R. J. Guenther and Edwin B. Cave

ABSTRACT: A system is disclosed that provides a switching capability on a selective basis between a plurality of laser beam inputs and a plurality of output light ports. The input devices and the output ports are arranged in a single plane with the inputs and outputs substantially perpendicular to each other. The matrix formed by the intersecting axes has a piezoelectric crystal positioned above each intersection. In response to an energizing potential, a particular crystal may be deformed into the plane of the light beams to reflect a selected input beam to a selected output.

PATENTED NOV 23 1971 3,622,792
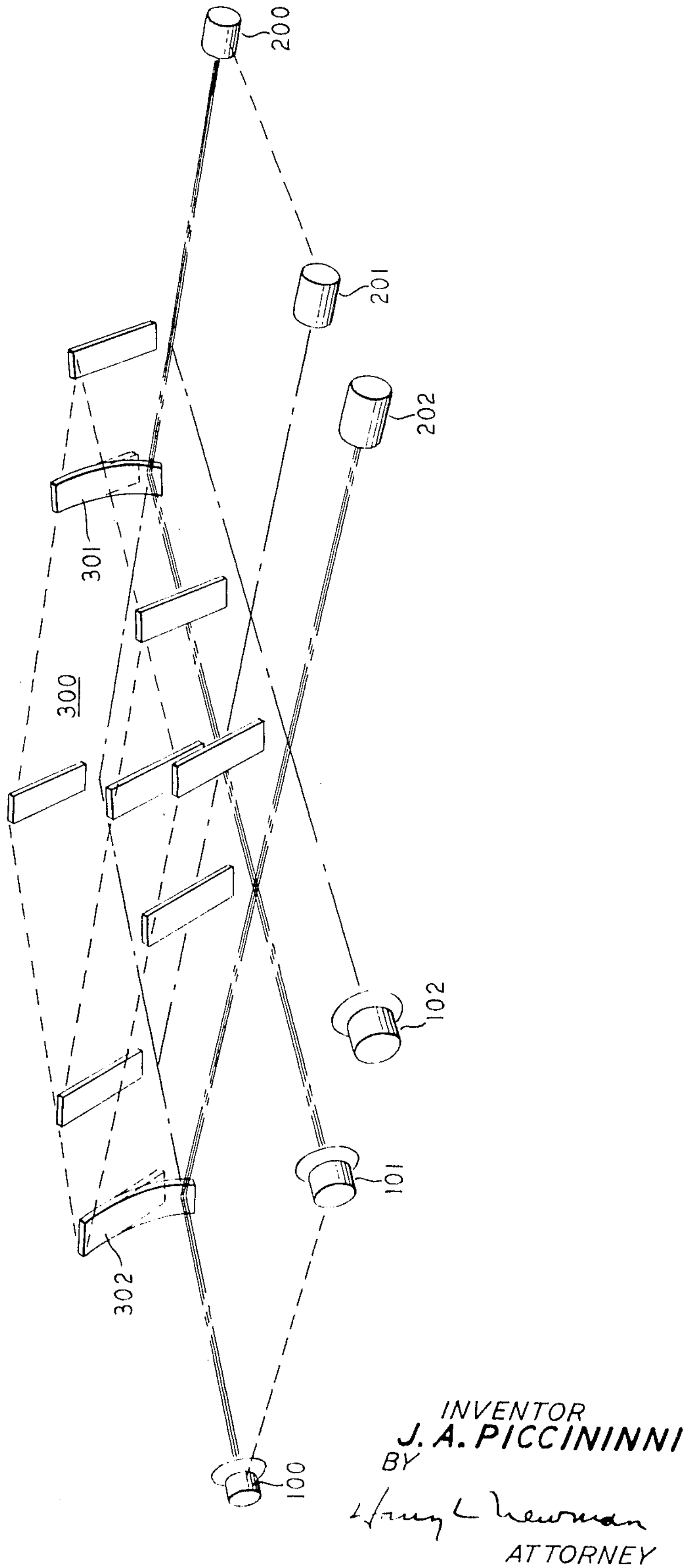
INVENTOR
J. A. PICCININNI
BY
[signature]
ATTORNEY

OPTICAL SWITCHING SYSTEM

This invention relates to communication switching systems and, more particularly, to such systems in which laser beams are used as the communication carrier.

BACKGROUND OF THE INVENTION

When the laser was first demonstrated, scientists and engineers involved in the communications field were extremely excited. A tremendous increase in the demand for communication facilities during the last generation had created a pressing problem. The capacity of even the most complex conventional communication system would soon be hopelessly inadequate to meet the need for more telephone conversation channels, more television channels, and more data links for the transfer of data information between computers. The laser beam represents a source of enough potential communication channels to handle any conceivable future demand.

For example, if a number of telephone conversations are being carried simultaneously over a single coaxial cable, each conversation requires a frequency bandwidth of 3800 Hz. with a separation between channels of 200 Hz. Since a coaxial cable can carry frequencies up to 12 MHZ, the capacity of a single coaxial cable is about 1,500 communication channels. By comparison, optical systems cover a frequency bandwidth of 900 THz or 75 million times the capacity of a coaxial cable. Of course, the full capacity of an optical system would probably never be utilized. For instance, optical filtering techniques are not nearly as sophisticated as electrical filtering techniques. Therefore, separation between channels for an optical system would need to be much wider than 200 Hz., with a resultant decrease in the number of communication channels obtainable for the optical range. However, the frequency range available is so broad that even with inefficient use of the bandwidth, the tremendous increase in capacity is apparent.

Even if it is assumed that a practical scheme is developed for modulating communication signals onto a laser beam carrier, transmitting the modulated carrier to a distant point, and demodulating the beam to separate the communication signals from the carrier, an important problem remains to be solved. Communication systems, such as a telephone system, which have a large number of input and output points are commonly interconnected by a complicated transmission network. The transmission network permits calls between two points to be completed over a variety of alternate routes. This permits traffic to be distributed economically within the network and prevents a failure of a single communication facility from interrupting all communication between the points at either end of the facility, since alternate routes may be established.

By way of illustration, if a call originated in Los Angeles and is intended for a New York number, it is commonly routed by way of Chicago, or St. Louis, or Denver, or Pittsburgh, or even a combination of several such intermediate switching centers. Until now, no practical system has been proposed to provide such a switching capability for an optical transmission system.

SUMMARY OF THE INVENTION

My invention, which is described herein, relates to a simple, practical, and efficient means of selectively switching any one of a plurality of input laser beams to any selected one of a plurality of output laser beam receivers.

DESCRIPTION OF THE DRAWING

The drawing shows a perspective view of a switch in accordance with my invention.

DETAILED DESCRIPTION

A switch matrix embodying my invention is shown in the drawing. It includes a plurality of laser beam inputs 100, 101, 102, etc. positioned so that their respective beams are projected along substantially parallel axes. A plurality of laser beam receivers 200, 201, 202, etc. are positioned so that the axes over which they receive laser beams are substantially parallel to each other and substantially perpendicular to, and in the same plane as, the axes of the beam inputs.

If the axes of the beam inputs and the beam receivers are extended, a spatial matrix is created. Each crosspoint of this matrix is associated with a particular beam input and with a particular beam receiver. A plurality of piezolectric crystals 300 are associated with the matrix such that one crystal is positioned above each cross-point.

The piezolectric crystals 300 each comprise a generally planar structure having a reflective surface. Each crystal deforms by bending in response to the application of an electrical potential across the crystal. The relationship between the applied electrical potential and the deformation of the piezolectric crystal is well known. A complete discussion is presented in Chapter III of "Physical Acoustics and the Properties of Solids" by Dr. Warren P. Mason published in 1958 by D. VanNostrand Company, Inc. However, for our purposes, it is sufficient to know that application of an electric signal of sufficient potential will bend the crystal from its normal position down into the plane of the laser beam. The outside surface of the crystal which faces the laser beam is made reflective by any of a number of known methods, for example electrodepositing a reflective metallic coating. Once again, the particular method employed is not germane to this description.

To switch the beam from input 100 to any of the receivers, one of the crystals located along the axis of input 100 must be deformed down into the path of the beam. For example, crystal 302 is deformed by the application of an electrical potential (from a source not shown). The beam from input 100 is then reflected by the surface of crystal 302 so that it now travels along the axis from which a beam is received by receiver 202. Information coming in on the beam from input 100 (from Los Angeles for example) is now being received by receiver 202 (which may for example connect to Boston).

If a second laser beam input is received while the switch connection just described is still being maintained, the switching desired for this second beam may be accomplished concurrently with the first connection. To establish a connection between input 101 and receiver 200, crystal 301 associated with the crosspoint common to both input and receiver is deformed. As a result, the beam from input 101 is deflected from its normal axis to the axis received by receiver 200.

Since beams of laser light are highly coherent, the effects of the first and second beams on each other is minimal where they intersect—particularly since they intersect at perpendicular directions. It should therefore be apparent that it would be possible to simultaneously establish a communication channel from each input of the switch to selected receivers. Of course, a separate receiver would be necessary for each channel established since only a single input beam can be directed to a particular receiver at one time.

If access to a large number of outputs is required, several switch matrices could be connected in stages. This method is commonly employed in switching conventional telephone calls. There, matrices of 8×8, 10×10, etc. connect in successive switching stages so that access is provided in the first stage to 10 trunks; in the second stage to 100 trunks; in the third stage to 1000 trunks; in the fourth stage to 10,000 subscribers. Thus, using only 10×10 switch matrices, access to 10,000 subscribers from 10 incoming trunks is provided by four switching stages.

Where large numbers of matrices are used in proximity to each other, and where a plurality of calls are switched simultaneously through a matrix, an additional advantage is realized by using my invention. Cross-point selection in my invention is obtained electrostatically. Therefore, no influence is exerted on the unoperated crosspoints by the operated cross-point. Since most conventional switching systems are electromagnetically actuated, the flux field generated by an operated crosspoint exerts an effect on the adjacent cross-points. Even where the influence exerted by a single operated crosspoint is insufficient to effect an adjacent unoperated crosspoint, if several crosspoints are operated, the cumulative effect of their individual flux fields may cause the undesired operation of an adjacent cross-point.

What is claimed:

1. A switch matrix for selectively switching laser beams comprising a plurality of laser beam sources arranged to project their associated beams along axes substantially parallel to each other, a plurality of laser beam receivers arranged to receive beams from axes substantially parallel to each other, and being located so that the axes of the receivers are substantially perpendicular to the axes of the sources, and crosspoint means associated with each intersection of the axes of the sources and the axes of the receivers for simultaneously redirecting a plurality of beams from selected sources to selected receivers.

2. A switch matrix in accordance with claim 1 wherein the crosspoint means comprises a piezolectric crystal having a reflective surface, the crystal being normally positioned out of the plane of both axes and being deflected into the plane of both axes in response to an applied electrical potential.

3. A switch matrix for selectively switching laser beams comprising a plurality of laser beam sources arranged to project their associated beams along optical axes substantially parallel to each other;

a plurality of laser beam receivers arranged to receive beams on optical axes substantially parallel to each other, and located so that the axes of the receivers are substantially perpendicular to the axes of the sources;

a plurality of beam deflectors; and means for selectively inserting a single beam deflector into the beam path from a selected source and deflecting the beam to a selected receiver, thereby establishing a first continuous optical communication channel between the selected source and the selected receiver.

4. A switch matrix in accordance with claim 3 further including means for simultaneously inserting a second single beam deflector into the beam path from a second selected source and deflecting the second beam to a second selected receiver, thereby establishing between the second selected source and the second selected receiver a second continuous optical communication channel simultaneous with the first previously established channel.

5. A switch matrix for simultaneously switching a plurality of laser beams to selectively establish a plurality of optical communication channels, the matrix comprising a plurality of laser beam sources arranged to project their associated beams along optical axes substantially parallel to each other;

a plurality of laser beam receivers arranged to receive beams on optical axes substantially parallel to each other, and located so that the axes of the receivers are substantially perpendicular to the axes of the sources;

a plurality of beam deflectors, each associated with a particular intersection of the beam axes and receiver axes and normally positioned out of the path of the beams; and selector means effective to deflect a beam from a selected source to a selected receiver and establish an optical communication channel between the selected source and the selected receiver by repositioning a single beam deflector.

6. A switch matrix in accordance with claim 5 wherein the selector means is also effective to reposition a second beam deflector to establish a plurality of simultaneous optical communication channels.

7. A switch matrix in accordance with claim 6 further including means to prevent the simultaneous establishment of a plurality of channels either from a single source or to a single receiver.

8. A switch matrix in accordance with claim 6 wherein the beam deflectors include a mirrored surface for deflecting the beam by reflection.

* * * * *